United States Patent
Anthonis et al.

(10) Patent No.: US 10,899,627 B2
(45) Date of Patent: Jan. 26, 2021

(54) PROCESS FOR MAKING MOLECULAR SIEVES

(71) Applicant: ExxonMobil Chemical Patents Inc., Baytown, TX (US)

(72) Inventors: Marc H. Anthonis, Hofstade (BE); Antonie Jan Bons, Vlaams-Brabant (BE); Machteld M. Mertens, Boortmeerbeek (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 16/892,372

(22) Filed: Jun. 4, 2020

(65) Prior Publication Data
US 2020/0399136 A1 Dec. 24, 2020

(30) Foreign Application Priority Data

Jun. 19, 2019 (EP) .................... 19181381

(51) Int. Cl.
*C01B 39/48* (2006.01)
*B01J 29/70* (2006.01)

(52) U.S. Cl.
CPC ............. *C01B 39/48* (2013.01); *B01J 29/70* (2013.01)

(58) Field of Classification Search
CPC .................. C01B 39/48; B01J 29/70
See application file for complete search history.

(56) References Cited

U.S. PATENT DOCUMENTS

| 4,698,217 A | 10/1987 | Valyocsik |
| 5,200,377 A | 4/1993 | Zones et al. |
| 6,160,191 A | 12/2000 | Smith et al. |
| 2009/0111959 A1 | 4/2009 | Cao et al. |
| 2014/0157986 A1 | 6/2014 | Ravikovitch et al. |
| 2014/0161717 A1 | 6/2014 | Johnson et al. |
| 2017/0259214 A1* | 9/2017 | Onozuka ............ B01D 67/0051 |

FOREIGN PATENT DOCUMENTS

| WO | 00/06493 A | 2/2000 |
| WO | 00/06494 A | 2/2000 |

OTHER PUBLICATIONS

Bernal et al., "Tubular MFI zeolite membranes made by secondary (seeded) growth", Catalysis Today, vol. 67, (2001) pp. 101-107.
den Exter et al., "Separation of Permanent Gases on the All-Silica 8-Ring Clathrasil DD3R", Studies in Furface Science and Catalysis, vol. 84, 1994, pp. 1159-1166.
Moteki et al., "A General Method for Aluminum Incorporation into High-Silica Zeolites Prepared in Fluoride Media", Chem. Mater., 2016, vol. 28, pp. 638-649.
Wagner et al., "Guest/Host Relationship in the Synthesis of the Novel Cage-Based Zeolites SSZ-35, SSZ-36, and SSZ-39", J. Am. Chem. Soc., 2000, vol. 122, pp. 263-273.

* cited by examiner

*Primary Examiner* — David M Brunsman

(57) ABSTRACT

A method of synthesising a molecular sieve of DDR framework type. The method comprises: preparing a synthesis mixture capable of forming a molecular sieve of DDR framework type, said synthesis mixture comprising water, a silicon source, optionally a source of a trivalent element X, optionally a source of a pentavalent element Z, optionally a source of hydroxide ions, optionally a source of a metal cation M, a structure directing agent, and seed crystals having a framework type selected from CHA and LEV; said synthesis mixture being substantially free from fluoride ions; heating said synthesis mixture under static crystallization conditions for a time sufficient to form crystals of said molecular sieve of DDR framework type, said crystallization conditions including a temperature of from 100° C. to 220° C.; and, recovering said crystals of the molecular sieve of DDR framework type from the synthesis mixture.

15 Claims, No Drawings

PROCESS FOR MAKING MOLECULAR SIEVES

CROSS REFERENCE TO RELATED APPLICATIONS

The present application claims priority to and the benefit of European Application No. 19181381.5, filed on 19 Jun. 2019, which is hereby incorporated by reference in its entirety.

FIELD OF THE INVENTION

This invention relates to a novel method of synthesizing a molecular sieve of DDR framework type, in particular a ZSM-58 molecular sieve.

BACKGROUND OF THE INVENTION

Molecular sieve materials, both natural and synthetic, have been demonstrated in the past to be useful in hydrocarbon separation processes (e.g. acting as adsorbents. Certain molecular sieves, such as zeolites, AlPOs, and mesoporous materials, are ordered, porous crystalline materials having a definite crystalline structure as determined by X-ray diffraction (XRD). Certain molecular sieves such as MCM-41 are ordered and produce specific identifiable X-ray diffraction patterns, but are not strictly crystalline. Within the molecular sieve material there are a large number of cavities which may be interconnected by a number of channels or pores. These cavities and pores are uniform in size within a specific molecular sieve material. Because the dimensions of these pores are such as to accept for adsorption molecules of certain dimensions while rejecting those of larger dimensions, these materials have come to be known as "molecular sieves" and are utilized in a variety of industrial processes.

Such molecular sieves, both natural and synthetic, include a wide variety of positive ion-containing crystalline silicates. These silicates can be described as three-dimensional framework of $SiO_4$ tetrahedra and Periodic Table Group 13 element oxide (e.g. $AlO_4$) tetrahedra. The tetrahedra are typically corner-shared through oxygen atoms with the electrovalence of the tetrahedra containing the Group 13 element (e.g. aluminum, gallium or boron) being charged balanced by the inclusion of a cation, for example a proton, an alkali metal or an alkaline earth metal cation.

Molecular sieves such as zeolite crystal structures have found a wide range of applications within refinery processes and other processes for manipulating petroleum streams. Some zeolite applications are catalytic in nature, while other applications focus on the ability of zeolites to selectively adsorb molecules within a gas stream. One example of selective adsorption of molecules from a gas phase stream is using a zeolite or another microporous material to remove contaminants from a stream containing hydrocarbons or other small gas phase organic molecules.

DDR-type molecular sieves are one class of zeolite useful in industrial processes, including for example in the selective adsorption of molecules. Within that structure type, ZSM-58 zeolites have received particular attention. DDR-type zeolites, and especially ZSM-58, have for instance been utilized in the separation of methane from carbon dioxide.

New selective and reliable synthetic routes to zeolites having a desired framework type, silica/alumina ratio and crystal size are sought after. Typically, zeolite syntheses involve hydrothermal crystallization from a synthesis mixture comprising sources of all the elements present in the zeolite such as sources of silica but also of alumina etc., and in many cases a structure directing agent and/or a source of hydroxide or fluoride ions. Often, a synthesis mixture is obtained by treating a solution of aluminate and silica with a compound which acts to cleave Si—O bonds, thus supplying growing crystals with Si and in some cases breaking up amorphous structures.

Early zeolite syntheses tended to use hydroxide ($OH^-$) to assist in Si—O bond cleavage, although more recent procedures have made use of fluoride ($F^-$). Fluoride is particularly effective in the production of high Si/Al ratio zeolites, and often provides larger crystals with fewer framework defects than seen in zeolites produced using hydroxide ions instead. The use of fluoride has provided access to a greater range of zeolite structures than had previously been commercially viable. However, the use of a synthesis mixture comprising fluoride ions presents a number of drawbacks. For example, it can be difficult to incorporate aluminum into the zeolite when using fluoride ions. It is disclosed in "A General Method for Aluminum Incorporation into High-Silica Zeolites Prepared in Fluoride Media", Chem. Mater. 2016, 28, pp. 638-649, Moteki et al., that using aluminosilicate zeolite crystals as the aluminum source in fluoride media can promote aluminum incorporation. Another drawback is that fluoride is often introduced as hydrofluoric acid, which is a highly corrosive and toxic substance. Hydrofluoric acid requires special handling methods and equipment and often leads to corrosion of reactor materials. Furthermore, in the case of supported molecular sieves, hydrofluoric acid may damage the support itself.

Zeolite synthesis also commonly use structure directing agents (SDAs) to help promote the formation of crystals with the desired structure, especially organic molecule structure directing agents. Typically, zeolite crystals form around structure directing agents with the structure directing agent occupying pores in the zeolite once crystallization is complete. The "as-synthesized" zeolite will therefore contain the structure directing agent in its pores so that, following crystallization, the "as-synthesized" zeolite is usually subjected to a calcination step to remove the structure directing agent. For many catalytic applications, it is also desired to include metal cations such as metal cations of Groups 2 to 15 of the Periodic Table of the Elements within the molecular sieve structure. This is typically accomplished by ion exchange treatment.

Another approach to encouraging formation of the desired zeolite structure that is often used as well as or instead of a structure directing agent is to add seed crystals to the synthesis mixture. Seeding a molecular sieve synthesis mixture can have beneficial effects, including for example controlling product particle size, accelerating synthesis, improving selectivity for the desire structure type, and sometimes avoiding the need for an organic structure directing agent. In some cases, it has been found that seeds of one structure type can be used to promote selective formation of a zeolite of a different structure type, known as heterostructural seeding (as opposed to isostructural seeding where seeds of the same structure type as that of the desired zeolite are used). International (PCT) Patent Application Publication No. WO 00/06494 discloses that colloidal seeds of the LEV structure type can be used in the synthesis of molecular sieves of the LEV, FER, MOR, ERI/OFF, MAZ, OFF, ZSM-57 and CHA structure types. The use of LEV colloidal seeds in the manufacture of crystalline molecular sieves is also disclosed in International (PCT) Patent Application Publication No. WO 00/06493.

Seeding methods can also be used in the preparation of zeolite membranes, such as supported membranes. In an article entitled "*Tubular MFI zeolite membranes made by secondary (seeded) growth*", Catalysis Today 2001, 67, pp. 101-107, Bernal et al. disclose that zeolite MFI membranes were grown on the surface of macroporous alpha-alumina and stainless steel support tubes by secondary (seeded) growth. It is disclosed that tubular supports were dipped in an aqueous suspension of colloidal silicalite-1 seed crystals, and then hydrothermally treated with solutions comprising a silica source selected from tetraethylorthosilicate and Ludox AS-40 and an additive selected from potassium hydroxide/ tetrapropylammonium bromide and tetrapropylammonium hydroxide.

Typically, during the hydrothermal crystallization step, the synthesis mixture is agitated (e.g. stirred) to aid mass transport and heat transfer through the synthesis mixture. However, it has been found that excessive agitation can reduce crystal size. In some industrial processes, it can be desirable to utilize large crystal zeolites. Furthermore, it can be difficult to produce supported zeolites from an agitated synthesis mixture. U.S. Pat. No. 6,160,191 discloses a process for making large crystal zeolites (e.g. having the MFI structure type) in which an aqueous synthesis mixture comprising sources of alumina, silica, alkali metal cations, optionally seed crystals and optionally a structure directing agent is heated under agitation to a temperature no greater than the effective nucleation temperature, and then heated in the absence of agitation to a temperature equal to or greater than the effective nucleation temperature.

U.S. Pat. No. 4,698,217 describes a method for synthesizing ZSM-58 using a methyltropinium salt as the structure directing agent. ZSM-58 is described as having a silica/ alumina molar ratio of 50 to 1000 and the Examples disclose synthesis of the material with silica/alumina molar ratios varying between 62 and 223.

In an article entitled "Separation of Permanent Gases on the All-Silica 8-Ring Clathrasil DD3R", Studies in Surface Science and Catalysis, 1994, 84, pp. 1159-1166, den Exter et al. report that DDR-type materials show promise as separation materials in the field of small hydrocarbons. It is disclosed that pure DD3R can be synthesized on a multi-gram scale from a synthesis mixture of water, 1-adamantanamine, ethylenediamine and tetramethoxysilane.

In an article entitled "*Guest/Host Relationships in the Synthesis of the Novel Cage-Based Zeolites SSZ-35, SSZ-36 and SSZ-39*", J. Am. Chem. Soc. 2000, 122. pp. 263-273, Wagner et al. report the synthesis of silica molecular sieves SSZ-35, SSZ-36 and SSZ-39, from a variety of cyclic and polycyclic quaternized amine molecules as structure directing agents. In particular, Table 4, Entry 12 of this article indicates that with the directing agent:

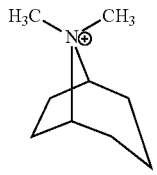

a CHA framework-type molecular sieve is produced with a synthesis mixture having a silica/alumina molar ratio 30, a mixture of CHA and DDR framework-type molecular sieves is produced with a synthesis mixture having a silica/alumina molar ratio 70 and a DDR framework-type molecular sieve is produced with a synthesis mixture having a silica/alumina molar ratio greater than 300.

US Patent Application Publication No. 2009/0111959 A1 discloses a method of producing a DDR framework-type material having both a high silica to alumina molar ratio (even a crystalline silicate) and a small crystal size using a directing agent containing the N-ethyl-tropanium cation. It is disclosed that seed crystals are used to facilitate crystallization of the zeolite, the seeds comprising a crystalline material having an AEI, DDR, LEV, CHA, ERI, AFX or OFF framework-type molecular sieve. More particularly, it is disclosed that DDR-type material can be obtained by combining $Al_2(SO_4)_3 \cdot 18H_2O$, N-ethyl-tropanium hydroxide and tetraethylorthosilicate to form a synthesis mixture, treating the mixture with hydrofluoric acid, mechanically mixing the resultant slurry with LEV colloidal seeds, and then crystallizing the seeded slurry at 140-180° C. under slow rotation (60 rpm).

US Patent Application Publication No. 2014/0161717 A1 discloses a method of making ZSM-58 crystals having improved crystal morphology by a combination of reducing the $H_2O:SiO_2$ molar ratio (e.g. to 12-20) in the synthesis mixture and introducing seed crystals. It is disclosed that the method disclosed therein is able to produce crystals having a more rounded disc-like shape, and that the seed crystals may have the same structure type as the desired zeolite. In the examples disclosed therein, ZSM-58 crystals are grown from a stirred synthesis mixture (stirred at 30-200 rpm) comprising sodium hydroxide and seeded with ZSM-58 crystals.

US Patent Application Publication No. 2014/0157986 discloses a method for forming DDR-type zeolites (e.g. ZSM-58) suitable for gas phase separations and having reduced contents of alkali metal impurities. It is disclosed that, following crystallization, the zeolite crystals are subjected to a number of rounds of alkali removal cycles during which the crystals are exposed to an acidic environment, thereby exchanging alkali metal impurities in the zeolite with hydrogen ions from the acidic solution.

U.S. Pat. No. 5,200,377 discloses a method of synthesizing zeolite SSZ-28 using dimethyl-tropinium or N,N-dimethyl-3-azonium bicyclo[3.2.2]nonane cation as a structure directing agent. Syntheses are carried out under stirred conditions, typically with the addition of an alkali metal hydroxide, and may use pre-prepared zeolite SSZ-28 as seed crystals.

There remains a need for a convenient method of preparing DDR-type zeolite materials, especially ZSM-58, in high yield and purity and on an industrially relevant scale.

SUMMARY OF THE INVENTION

The invention provides a method of synthesizing a molecular sieve of DDR framework type, the method comprising the steps of: a) preparing a synthesis mixture capable of forming a molecular sieve of DDR framework type, said synthesis mixture comprising water, a silicon source, optionally a source a trivalent element X, optionally a source of a pentavalent element Z, optionally a source of hydroxide ions, optionally a source of a metal cation M (such as an alkali metal cation and/or an alkaline earth metal cation), a structure directing agent, and seed crystals having a framework type selected from CHA and LEV; said synthesis mixture being substantially free from fluoride ions; b) heating said synthesis mixture under static crystallization conditions for a time sufficient to form crystals of said molecular sieve of DDR framework type, said crystallization conditions including a temperature of from 100° C. to 220° C.; and, c) recovering said crystals of the molecular sieve of DDR framework type from the synthesis mixture. Optionally, the silicon source is a silicon oxide. Optionally, the trivalent element X is aluminium, for example wherein the source of trivalent element X is aluminum oxide.

Using a synthesis mixture substantially free from fluoride avoids the presence of hydrofluoric acid in the synthesis mixture, thereby simplifying the synthesis method. Step (b) is carried out under effective hydrothermal crystallization conditions, for example wherein the synthesis mixture is maintained at a temperature equal to or greater than the temperature at which hydrothermal crystallization is initiated. For example, said crystallization conditions include a temperature equal to or above the temperature at which hydrothermal crystallization is initiated. It will be understood that there is often a relationship between initiation temperature and initiation time. Typically, crystallization initiates after a shorter time at higher temperatures. Thus, while initiation at relatively low temperatures may be possible, the time taken for crystallization to initiation may not be commercially acceptable. Initiation of crystallization can be detected, for example, by subjecting a sample of the mixture to XRD analysis and checking for diffraction peaks indicative of the presence of the desired crystalline material. It will be appreciated that a synthesis mixture is under static conditions when the synthesis mixture is not agitated, for example by mechanical agitation, such as stirring. Methods of mechanical agitation include stirring the mixture within a vessel (e.g. with a paddle) and pumping the mixture from one part of a vessel to another. Maintaining the synthesis mixture at a temperature sufficient to effect hydrothermal crystallization under static conditions allows large crystals to be obtained, and allows crystals to be conveniently formed on a support.

Optionally, the structure directing agent is a N,N-dialkyltropinium salt, 1-adamantanamine, or a N,N-dialkyl-3-azonium bicyclo[3.2.2]nonane salt, for example a N,N-dialkyltropinium salt or 1-adamantanamine Examples of suitable N,N-dialkyltropinium salts include N,N-diethyltropinium salts, N,N-methylethyltropinium salts and N,N-dimethyltropinium salts (also referred to as methyltropinium salts). Examples of suitable dialkyltropinium salts include dialkyltropinium halides, e.g. dialkyltropinium chloride or dialkyltropinium iodide, or dialkyltropinium hydroxide. Preferably, when the structure directing agent is a halide salt, the halide salt is not a fluoride salt. Optionally, the structure directing agent is a methyltropinium halide, e.g. methyltropinium iodide or methyltropinium chloride, or a methyltropinium hydroxide, such as methyltropinium iodide. Examples of suitable N,N-dialkyl-3-azonium bicyclo[3.2.2]nonane salts include N,N-dialkyl-3-azoniumbicyclo [3.2.2] nonane salts, such as N,N-dimethyl-3-azoniumbicyclo [3.2.2] nonane salts, N,N-methylethyl-3-azoniumbicyclo [3.2.2] nonane salts or N,N-diethyl-3-azoniumbicyclo [3.2.2] nonane salts. Examples of suitable N,N-dialkyl-3-azonium bicyclo[3.2.2] nonane salts include N,N-dialkyl-3-azonium bicyclo [3.2.2] nonane halides, e.g. N,N-dialkyl-3-azonium bicyclo[3.2.2] nonane chloride or N,N-dialkyl-3-azonium bicyclo[3.2.2] nonane iodide, or N,N-dialkyl-3-azonium bicyclo[3.2.2] nonane hydroxide Optionally, the structure directing agent is a methyltropinium salt or 1-adamantamine, for example a methyltropinium halide or 1-adamantamine, such as methyltropinium iodide or 1-adamantamine. The present inventors have found that the combination of using a synthesis mixture free from fluoride, using a methyltropinium cation structure directing agent, and performing crystallization seeded by non-DDR seed crystals (specifically CHA or LEV framework seeds) under static conditions, provides a particularly effective method of preparing a crystalline material having a DDR framework. More particularly, the present inventors have found that such a method provides convenient access to such crystalline materials, especially supported materials, on an industrial scale. Structured crystalline materials are particularly useful in forming membranes useful in gas separation processes.

The invention also provides a crystalline material made according to the synthesis method of the invention.

The invention further provides an adsorbent material comprising the crystalline material of the invention.

The invention further provides a hydrocarbon separation process comprising the step of contacting a hydrocarbon feedstock with an adsorbent material of the invention. In one embodiment the separation process is a process for separating methane from carbon dioxide.

It will of course be appreciated that features described in relation to one aspect of the present invention may be incorporated into other aspects of the present invention. For example, the method of the invention may incorporate any of the features described with reference to the apparatus of the invention and vice versa.

DETAILED DESCRIPTION

The method of synthesizing a crystalline material according to the invention involves preparing a synthesis mixture according to conventional techniques, except that the synthesis mixture is substantially free from fluoride, and that the synthesis mixture comprises seed crystals having a framework type other than DDR. In some embodiments, the synthesis mixture is further differentiated in that it additionally comprises a methyltropinium cation as the structure directing agent. The method of synthesizing a crystalline material according to the invention further involves crystallizing the material according to convention techniques, except that crystallization is carried out under static conditions.

The Synthesis Mixture

As mentioned above, the synthesis mixture can be prepared according to conventional methods. The components of the synthesis mixture may be combined in any order.

Optionally, the synthesis mixture comprises a hydroxide source, such as a hydroxide salt, for example an alkali metal hydroxide salt and/or an alkaline earth metal hydroxide salt. Optionally, the synthesis mixture comprises a hydroxide salt selected from lithium hydroxide, caesium hydroxide, magnesium hydroxide, and calcium hydroxide, such as sodium hydroxide and potassium hydroxide. Optionally, the synthesis mixture comprises a hydroxide salt selected from calcium hydroxide and magnesium hydroxide. The synthesis mixture is substantially, e.g. entirely, free from fluoride. For example, it may be that the synthesis mixture has a fluoride content of no more than 0.05 wt %, such as no more than 0.01 wt %, for example a fluoride content of about 0 wt %, based on the weight of the synthesis mixture. Optionally, no hydrogen fluoride is used in the method, for example no hydrogen fluoride is included in or added to the synthesis mixture. Hydroxide can also be present as the anion of any charged (organic) structure directing agent or modifier which may be present or by the use of sodium aluminate or potassium aluminate as a source of aluminum (if present), or by the use of sodium silicate or potassium silicate as the source of silicon.

The seeds have a framework type selected from LEV and CHA, preferably CHA. Optionally, the synthesis mixture comprises at least about 5 ppmw seed crystals, for example at least about 0.01 wt % seed crystals, such as at least about 0.05 wt % seed crystals, for example at least about 0.1 wt % seed crystals, based on the weight of the synthesis mixture. Optionally, the synthesis mixture comprises from about 5 ppmw to about 5 wt %, for example about 0.01 wt % to about 1 wt % seed crystals, such as from about 0.05 wt % to about 0.5 wt % seed crystals, for example from about 0.1 wt % to about 0.2 wt % seed crystals, based on the weight of the synthesis mixture. Optionally, the seed crystals are included in the synthesis mixture in the form of a colloidal suspension in a liquid medium, such as water. As used herein, the expression "colloidal suspension" refers to a suspension containing discrete finely divided particles dispersed in a continuous liquid phase; preferably, it refers to a suspension that is stable, in the sense that no visible separation occurs or sediment forms, in a period sufficient for the use intended, advantageously for at least 10 hours, more advantageously at least 20 hours, preferably at least 100 hours, and more preferably at least 500 hours at ambient temperature (23° C.). The maximum size of the particles for the suspension to remain stable (peptized) will depend to some extent on their shape, and on the nature and pH of the continuous medium, as well as on the period during which the suspension must remain usable. The particles may be spherical, or of other shapes. Where particles are other than spherical, the dimension referred to is their smallest dimension. The colloidal seeds generally have an average diameter (or smallest dimension, corresponding to the number-average primary particle size as determined by SEM for 100 or more particles) of 300 nm or less, in particular of 200 nm or less, more particularly of 100 nm or less, provided that said colloidal seeds form a stable suspension, in the sense that no visible separation occurs or sediment forms, in a period sufficient for the use intended. The production of colloidal seed suspensions and their use in the synthesis of molecular sieves are disclosed in, for example, International Patent Application Publication Nos. WO 00/06493 and WO 00/06494.

Si sources (e.g. silicon oxides) suitable for use in the method include silicates, e.g., tetraalkyl orthosilicates such as tetramethylorthosilicate, fumed silica, such as Aerosil (available from Degussa) and Cabosil, precipitated silica, alkali metal silicates such as potassium silicate and sodium silicate, and aqueous colloidal suspensions of silica, for example, that sold by E.I. du Pont de Nemours under the tradename Ludox®.

Optionally, the synthesis mixture comprises one or more sources of a trivalent element X such as aluminum, boron, and/or gallium, preferably X comprising Al, and more preferably X being Al. Suitable sources of trivalent element X that can be used to prepare the synthesis mixture depend on the element X that is selected. In embodiments where X is aluminum, Al sources (e.g. aluminum oxides) suitable for use in the method include aluminum salts, especially water-soluble salts, such as aluminum sulfate, aluminum nitrate, aluminum hydroxide, sodium aluminate, and aluminum alkoxides such as aluminum isopropoxide, as well as hydrated aluminum oxides, such as boehmite, gibbsite, and pseudoboehmite, and mixtures thereof. In embodiments where X is boron, B sources include boric acid, sodium tetraborate and potassium tetraborate. Sources of boron tend to be more soluble than sources of aluminum in hydroxide-mediated synthesis systems. In embodiments where X is gallium, Ga sources include sodium gallate, potassium gallate, and gallium salts such as gallium chloride, gallium sulfate, and gallium nitrate. Alternatively, the synthesis mixture does not contain any trivalent element X.

Alternatively or in addition to previously mentioned sources of Si and Al, sources containing both Si and Al elements can also be used as sources of Si and Al. Examples of suitable sources containing both Si and Al elements include amorphous silica-alumina gels or dried silica alumina powders, silica aluminas, clays, such as kaolin, metakaolin, and zeolites, in particular aluminosilicates such as synthetic faujasite and ultrastable faujasite, for instance USY, beta or other large to medium pore zeolites.

Optionally, the synthesis mixture comprises one or more sources of a pentavalent element Z, such as phosphorus. Suitable sources of pentavalent elements Z depend on the element Z that is selected. Preferably, Z is phosphorus. Suitable sources of phosphorus include phosphoric acid, organic phosphates such as triethyl phosphate and tetraethylammonium phosphate, and aluminophosphates. Alternatively, the synthesis mixture does not contain any pentavalent element Z.

Optionally, the synthesis mixture comprises one or more sources of hydroxide ions, for example, an alkali metal hydroxide such as sodium hydroxide or potassium hydroxide or lithium hydroxide, most often sodium hydroxide. Hydroxide can also be present as a counter ion of the structure directing agent or by the use of aluminum hydroxide as a source of X. Alternatively, the synthesis mixture may be free from a hydroxide source, for example when the structure directing agent is a basic structure directing agent (such as adamantamine).

Optionally, the synthesis mixture comprises one or more sources of an alkali metal cation M, such as lithium, sodium and/or potassium, preferably sodium and/or potassium, more preferably sodium. Additionally or alternatively, the synthesis mixture optionally comprises one or more sources of an alkaline earth metal cation, such as magnesium and/or calcium. The sodium source, when present, may be sodium hydroxide, sodium aluminate, sodium silicate, or sodium salts such as NaCl, NaBr or sodium nitrate. The potassium source, when present, may be potassium hydroxide, potassium aluminate, potassium silicate, or potassium salts such as KCl or NaBr or potassium nitrate. The lithium source, when present, may be lithium hydroxide or lithium salts such as LiCl, LiBr, LiI, lithium nitrate, or lithium sulfate. The calcium source, when present, may be calcium hydroxide, for example. The magnesium source, when present, may be magnesium hydroxide, for example.

The water may be added in any amount suitable to dissolve the components and to prepare the desired crystalline material. The synthesis mixture will comprise an aqueous liquid phase and may also comprise some undissolved solid components as well as crystallized material. The liquid present in the synthesis mixture is substantially a single phase, typically an aqueous solution, gel phase, slurry, paste or moist powder. The liquid present in the synthesis mixture typically comprises less than 5 wt %, optionally less than 2 wt %, optionally less than 1 wt % of water-insoluble liquid components. In particular, the liquid present in the synthesis mixture is not an emulsion or a microemulsion.

Optionally, the synthesis mixture comprises X and $SiO_2$ in a $X:SiO_2$ ratio of up to 0.02, such as up to 0.002, for example up to 0.00125. Optionally, the synthesis mixture is substantially, e.g. entirely, free from X. Optionally, the synthesis mixture comprises $Al_2O_3$ and $SiO_2$ in a $Al_2O_3:SiO_2$ ratio of up to 0.02, such as up to 0.002, for example up to 0.00125. Optionally, the synthesis mixture is substantially, e.g.

entirely, free from $Al_2O_3$, for example the $Al_2O_3:SiO_2$ ratio is about 0. Optionally, the synthesis mixture comprises $H_2O$ and $SiO_2$ in a $H_2O:SiO_2$ ratio of from 5 to 200, preferably 10 to 150. Optionally, the synthesis mixture comprises $H_2O$ and $SiO_2$ in a $H_2O:SiO_2$ ratio of from 5 to 200, such as from 10 to 100, for example from 25 to 60, optionally when the SDA is a N,N-dialkyltropinium salt or a N,N-dialkyl-3-azonium bicyclo[3.2.2]nonane salt. Optionally, the synthesis mixture comprises $H_2O$ and $SiO_2$ in a $H_2O:SiO_2$ ratio of from 5 to 200, such as from 10 to 150, for example from 75 to 125, optionally when the SDA is 1-adamantanamine. Optionally, the synthesis mixture comprises $OH^-$ and $SiO_2$ in a $OH^-:SiO_2$ ratio of from 0 to 2.0, such as from 0.05 to 1.0, for example from 0.10 to 0.50. Optionally, the synthesis mixture comprises $OH^-$ and $SiO_2$ in a $OH^-:SiO_2$ ratio of from 0 to 2.0, such as from 0.01 to 1.0, for example from 0.10 to 0.50, optionally when the SDA is a N,N-dialkyltropinium salt or a N,N-dialkyl-3-azonium bicyclo[3.2.2]nonane salt. Optionally, the synthesis mixture comprises $OH^-$ and $SiO_2$ in a $OH^-:SiO_2$ ratio of from 0 to 2.0, such as from 0.01 to 1.0, for example from 0.10 to 0.50, optionally when the SDA is 1-adamantamine. Optionally, the synthesis mixture is free from $OH-$, optionally when the SDA is 1-adamantanamine. Optionally, the synthesis mixture comprises M and $SiO_2$ in a $M:SiO_2$ ratio of from 0 to 2.0, such as from 0.05 to 1.0, for example from 0.10 to 0.30. Optionally, the synthesis mixture comprises M and $SiO_2$ in a $M:SiO_2$ ratio of from 0 to 2.0, such as from 0.01 to 1.0, for example from 0.10 to 0.50, optionally when the SDA is a N,N-dialkyltropinium salt or a N,N-dialkyl-3-azonium bicyclo[3.2.2]nonane salt. Optionally, the synthesis mixture comprises M and $SiO_2$ in a $M:SiO_2$ ratio of from 0 to 2.0, such as from 0.01 to 1.0, for example from 0.10 to 0.50, optionally when the SDA is 1-adamantanamine. Optionally, the synthesis mixture comprises structure directing agent (R) and $SiO_2$ in a $R:SiO_2$ ratio of from 0.01 to 2.0, such as from 0.10 to 0.50. Optionally, the synthesis mixture comprises structure directing agent (R) and $SiO_2$ in a $R:SiO_2$ ratio of from 0.01 to 2.0, for example from 0.10 to 0.50, such as from 0.15 to 0.40, optionally when the SDA is a N,N-dialkyltropinium salt or a N,N-dialkyl-3-azonium bicyclo[3.2.2]nonane salt. Optionally, the synthesis mixture comprises structure directing agent (R) and $SiO_2$ in a $R:SiO_2$ ratio of from 0.01 to 2.0, for example from 0.10 to 0.80, such as from 0.20 to 0.60, optionally when the SDA is 1-adamantanamine. Optionally, the synthesis mixture comprises ethylenediamine (EN) and $SiO_2$ in a $EN:SiO_2$ ratio of from 1 to 10, such as from 2 to 6, for example from 3 to 5, optionally when the SDA is 1-adamantanamine. Optionally, the synthesis mixture comprises methanol (MeOH) and $SiO_2$ in a $MeOH:SiO_2$ ratio of from 1 to 50, such as from 2 to 30, for example from 4 to 15, optionally when silicon source is a silicon oxide other than tetramethylorthosilicate.

Crystallisation and Recovery

Optionally, the crystallization conditions in step (b) of the method include a temperature of from 100° C. to 200° C., preferably from 120° C. to 180° C., for instance from 130° C. to 170° C., in particular from 140° C. to 160° C.

The time required for the crystallization under static conditions will vary. For example, at higher temperatures, the crystallization time may be reduced. Optionally, the crystallization conditions in step (b) of the method include heating for a period of from 1 to about 800 hours, such as from about 10 to less than 600 hours, in particular from about 24 to 140 hours, for example from about 60 to about 120 hours. The crystallization time can be established by methods known in the art such as by sampling the synthesis mixture at various times and determining the yield and x-ray crystallinity of precipitated solid.

Crystallization can be carried out in any suitable reactor vessel, such as, for example, a polypropylene jar or a Teflon® bottle, an acid digestion vessel, a Teflon® lined or stainless steel autoclave, a plough shear mixer, or a reaction kettle, preferably a polypropylene jar, a Teflon® bottle, or a Teflon® lined or stainless steel autoclave.

Optionally, the synthesis mixture is contacted with a support material during step (b). For example, it may be that the crystalline material recovered from the synthesis mixture is a supported crystalline material, such as a zeolite membrane. Preferably, the support comprises a porous material. Preferably, the seed crystals are attached to the support material. It has been found that seed crystals attached to a support provide nuclei for further growth, such as growth filling intercrystalline space on the support. A suitable method for promoting crystal growth on a porous support material is disclosed in an article entitled *"Tubular MFI zeolite membranes made by secondary (seeded) growth"*, Catalysis Today 2001, 67, pp. 101-107, Bernal et al., Preferably, the support material is in the form of a sheet, mesh or wire; optionally the support material takes the shape of a tube (or is provided as a plurality of tubes). Optionally, the support is a ceramic or metallic support, such as a ceramic support comprising α-alumina or a metallic support comprising stainless steel. Optionally, the porous support has a pore size of from 10 nm to 1000 nm, such as 150 nm to 600 nm. Optionally, the method comprises a step of seeding a porous support material, such as by dip-coating the support or by spin-coating the support. Optionally, seeding the support comprises contacting the support with an aqueous suspension of seed crystals, for example by immersing the support in the aqueous suspension and then withdrawing the support.

Optionally, the method includes a step of heating the synthesis mixture under stirred conditions before or after, preferably before, step (b). In particular, the method optionally comprises a step of heating the synthesis mixture under stirred conditions at a temperature less than the temperature of step (b). For example, when the crystallization conditions of step (b) include a temperature of 100° C., the method optionally comprises a step of heating the synthesis mixture under stirred conditions at a temperature of no more than 99° C., preferably before step (b). As a further example, when the crystallization conditions of step (b) include a temperature of 220° C., the method optionally comprises a step of heating the synthesis mixture under stirred conditions at a temperature of no more than 219° C., preferably before step (b). Optionally, the method includes heating the synthesis mixture under stirred conditions to a temperature of no more than 99° C., optionally before step (b). Optionally, when the synthesis mixture is heated under stirred conditions, the synthesis mixture is heated under stirred conditions for a period of from 0.1 to 10 hours, such as 0.5 to 5 hours, for example 1 to 3 hours.

Optionally, the method comprises heating the synthesis mixture to a temperature of no more than T during a heating period H1, wherein T is from about 100° C. to about 220° C., optionally wherein H1 is from 0.1 to 10 hours, such as 0.5 to 5 hours, for example 1 to 3 hours. Optionally, the crystallization conditions of step (b) of the method include maintaining the synthesis mixture at a temperature of no less than T during a maintaining period H2, optionally wherein H is from about 1 to about 800 hours, such as from about 10 to less than 600 hours, for example from about 24 to about 120 hours. During the heating period H1, the synthesis mixture may be heated under static, stirred or discontinuous stirred conditions in a suitable reactor vessel.

Optionally, the synthesis mixture is subjected to agitation during the heating period H1, for example by stirring. Optionally during the heating period H1, the synthesis mixture is heated with agitation provided by a mixing device which moves the mixture in a turbulent fashion such as occurs with a pitch blade turbine mixer. Other means of introducing agitation known to one skilled in the art can be employed, such as pumping the synthesis mixture around the vessel holding the mixture. The purpose of the agitation is to assist mass and heat transfer through the synthesis mixture in a uniform manner. The degree of agitation should be low enough to minimize shear-induced seed formation in the synthesis mixture. When a turbine mixer is employed, the degree of agitation can be measured as the speed at which the blade tip moves through the synthesis mixture (tip speed). Preferably the tip speed should be less than about 5 meters per second (M/s) and more preferably less than about 3.5 M/s. The tip speed of the mixer can also be varied depending on the temperature distribution of the synthesis mixture and changes in mixture viscosity during heat up. Preferably a constant tip speed of about 1-2.0 M/s is used until a temperature from about 100° C. to about 120° C. is reached, and then the tip speed is increased gradually as heat up continues until the temperature T is reached. Most preferably the maximum tip speed is about 2-5 M/s at a temperature of about 130° C. to about 150° C., and most preferably from about 2 to about 3.5 M/s at a temperature from about 140° C. to about 150° C. The first period, during which the synthesis mixture is heated up, should be as fast as practical to minimize the amount of time the synthesis mixture is agitated to reduce shear induced seeding. The time during which stirring occurs at temperatures above 130° C. is preferably less than about 6 hours and more preferably less than 3 hours. After the synthesis mixture reaches temperature T, the agitation is stopped. Heating of the synthesis mixture can be allowed to occur after the stop of agitation with no undue effect to product quality. The temperature can also be maintained at the temperature reached when agitation was stopped. Optionally, the synthesis mixture is heated to a temperature above T after agitation is stopped, for example the temperature of the synthesis mixture is increased to a temperature greater than T during step (b) of the method.

It will be appreciated that the synthesis mixture may optionally be agitated (e.g. stirred) after step (b). Optionally, the synthesis mixture is subjected to discontinuous stirring while heating, according to which the synthesis mixture may be subjected to a plurality of static crystallization steps separated by agitated crystallization steps. For example, step (b) of the method may be repeated following a step of heating the synthesis mixture under stirred crystallization conditions, said crystallization conditions including a temperature of from 100° C. to 220° C.

Optionally, the crystallization conditions of step (b) include a temperature equal to or greater than the effective nucleation temperature of the synthesis mixture. For example, T is equal to or greater than the effective nucleation temperature of the synthesis mixture. The effective nucleation temperature can be understood to be the temperature at which continued stirring of the heated zeolite synthesis mixture would result in significant decrease of the mass mean crystal diameter of the product zeolite crystals, e.g., a reduction of the mass mean crystal diameter of the product crystals of 15 percent or greater. Preferably, the temperature of step (b) of the method (e.g. temperature T) is a temperature at which, if the synthesis mixture is stirred, stirring will result in a reduction of the mass mean crystal diameter of the product zeolite crystals of less than 10 percent, more preferably less than 5 percent, as compared to the product zeolite crystals obtained from a corresponding unstirred synthesis mixture. It will be appreciated that the effective nucleation temperature of the synthesis mixture will depend on the composition of the synthesis mixture which in turn will be governed by the zeolite being prepared. The effective nucleation temperature can be confirmed by procedures known in the art such as by x-ray detection of crystal presence greater than any seed level. Changes in synthesis mixture viscosity during the first period can also be used to determine the onset of crystallization. The effective nucleation temperature will be a function of the type of zeolite being prepared and may often be expressed as a temperature range rather than a single sharply defined temperature, but will generally be between about 100° C. and about 150° C. for DDR type zeolites. For ZSM-58, the effective nucleation temperature will usually be in the range of from about 120° C. to about 150° C.

Processing the Crystalline Material

As a result of the crystallization process, the recovered crystalline material product contains within its pores at least a portion of the structure directing agent used in the synthesis. Preferably, the method additionally comprises activating the crystalline material to remove the structure directing agent from the molecular sieve, leaving active sites within the microporous channels of the molecular sieve open for contact with a feedstock. The activation process is typically accomplished by calcining, or essentially heating the molecular sieve comprising the template in the presence of an oxygen-containing gas. In some cases, it may be desirable to heat the molecular sieve in an environment having a low or zero oxygen concentration. This type of process can be used for partial or complete removal of the structure directing agent from the intracrystalline pore system. In other cases, particularly with smaller structure directing agents, complete or partial removal from the sieve can be accomplished by conventional desorption processes. Typically, the recovered crystalline material is subjected to a calcining step involving heating the material at a temperature of at least about 200° C., preferably at least about 300° C., more preferably at least about 370° C. for at least 1 minute and generally not longer than 20 hours. While subatmospheric pressure can be employed for the thermal treatment, atmospheric pressure is usually desired for reasons of convenience. The thermal treatment can be performed at a temperature up to about 925° C. For instance, the thermal treatment can be conducted at a temperature of from 400 to 600° C., for instance from 500 to 550° C., in the presence of an oxygen-containing gas, for example, in air.

The molecular sieve may also be subjected to an ion-exchange treatment, for example, with aqueous ammonium salts, such as ammonium nitrates, ammonium chlorides, and ammonium acetates, in order to remove remaining alkali metal cations and/or alkaline earth metal cations and to replace them with protons thereby producing the acid form of the molecular sieve. To the extent desired, the original cations of the as-synthesized material, such as alkali metal cations, can be replaced by ion exchange with other cations. Preferred replacing cations can include hydrogen ions, hydrogen precursor, e g ammonium ions and mixtures thereof. The ion exchange step may take place after the as made molecular sieve is dried. The ion-exchange step may take place either before or after a calcination step.

The molecular sieve may also be subjected to other treatments such as steaming and/or washing with solvent. Such treatments are well-known to the skilled person and are carried out in order to modify the properties of the molecular sieve as desired.

Once the crystalline material has been synthesized, it can be formulated into a product composition by combination with other materials, such as binders and/or matrix materials that provide additional hardness to the finished product. These other materials can be inert or catalytically active materials.

In particular, it may be desirable to incorporate the crystalline material of the present invention or manufactured by the process of the present invention with another material that is resistant to the temperatures and other conditions employed during use. Such materials include synthetic or naturally occurring zeolites as well as inorganic materials such as clays, silica and/or metal oxides such as alumina, yttria, zirconia, gallium oxide, zinc oxide and mixtures thereof. The metal oxides may be either naturally occurring or in the form of gelatinous precipitates or gels including mixtures of silica and metal oxides. Naturally occurring clays which may be used include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or after being subjected to calcination, acid treatment or chemical modification. These binder materials are resistant to the temperatures and other conditions, e.g., mechanical attrition, which occur in various hydrocarbon separation processes. Thus the crystalline material of the present invention or manufactured by the process of the present invention may be used in the form of an extrudate with a binder. They are typically bound by forming a pill, sphere, or extrudate. The extrudate is usually formed by extruding the molecular sieve, optionally in the presence of a binder, and drying and calcining the resulting extrudate. Further treatments such as steaming, and/or ion exchange may be carried out as required. The molecular sieve may optionally be bound with a binder having a surface area of at least 200 m$^2$/g, optionally at least 300 m$^2$/g.

These materials may be incorporated into naturally occurring clays, e.g., bentonite and kaolin, to improve the crush strength of the product under commercial operating conditions.

In addition to the foregoing materials, the crystalline material of the present invention can be composited with a porous matrix material such as silica-alumina, silica-magnesia, silica-zirconia, silica-thoria, silica-beryllia, silica-titania as well as ternary compositions such as silica-alumina-thoria, silica-alumina-zirconia, silica-alumina-magnesia and silica-magnesia-zirconia.

The relative proportions of crystalline material and inorganic oxide matrix may vary widely, with the crystalline material content ranging from about 1 to about 100 percent by weight and more usually, particularly when the composite is prepared in the form of extrudates, in the range of about 2 to about 95, optionally from about 20 to about 90 weight percent of the composite.

The Crystalline Material

According to a second aspect, the present invention provides a crystalline material made according to the method of the first aspect of the invention.

Optionally, the crystalline material having a DDR framework type has, in its calcined and anhydrous form, a composition with the molar relationship $(n)Al_2O_3:SiO_2$, wherein n is from about 0 to less than about 0.01, such as from about 0 to about 0.005, for example from about 0.0005 to about 0.00125. Preferably, the crystalline material is ZSM-58.

Typically, the crystalline material product is formed in solution and can be recovered by standard means, such as by centrifugation or filtration. The separated product can also be washed, recovered by centrifugation or filtration and dried. Optionally, the crystalline material product comprises particles with an average crystal size below 2 microns and typically about 1 to 1.5 microns (determined through a numerical average of crystal sizes as viewed using a scanning electron microscope). It will be appreciated that crystal size can be adjusted by altering the quantity of seed crystals in the synthesis mixture, with an increase in the amount of seed crystals resulting in a reduction in average crystal size. An average crystal size below about 1 micron may hinder recovery and processing of the crystalline material product.

In its as-synthesized form, the crystalline material produced by the method of the present invention preferably has a composition involving the molar relationship: $(n)Al_2O_3:SiO_2:(m)R:(x)F:(z)H_2O$; wherein: n is as defined in the preceding paragraph; m ranges from about 0.01 to about 2, such as from about 0.1 to about 1; x ranges from about 0 to about 0.1, such as from about 0.0001 to about 0.001; z ranges from about 0.5 to about 100, such as from about 5 to about 75, e.g. from about 30 to about 60; and, R is at least one methyltropinium cation.

Use of the Crystalline Material

The crystalline material of the invention can be used to dry gases and liquids; for selective molecular separation based on size and polar properties; as an ion-exchanger; as a chemical carrier; and in gas chromatography.

According to a third aspect, the invention provides a hydrocarbon separation process comprising the step of contacting a hydrocarbon feedstock with an adsorbent material of the invention, for example wherein the hydrocarbon feedstock comprises methane and carbon dioxide and wherein the separation process is a process for separating methane from carbon dioxide.

The separation of methane from carbon dioxide typically involves passing a gaseous mixture containing methane and carbon dioxide, such as natural gas, though a mixed matrix membrane comprising a continuous organic polymer phase having dispersed therein particles of the DDR framework material. The size of the pores of the DDR framework material are such that they readily permit the passage of carbon dioxide, but only permit the passage of methane at a significantly slower rate.

The preferred membranes are made from polymer materials that will pass carbon dioxide (and nitrogen) preferentially over methane and other light hydrocarbons. Such polymers are well known in the art and are described, for example, in U.S. Pat. Nos. 4,230,463 and 3,567,632. Suitable membrane materials include polyimides, polysulfones, and cellulosic polymers.

Preferably, the polymer is a rigid, glassy polymer as opposed to a rubbery polymer or a flexible glassy polymer. Glassy polymers are differentiated from rubbery polymers by the rate of segmental movement of polymer chains. Polymers in the glassy state do not have the rapid molecular motions that permit rubbery polymers their liquid-like nature and their ability to adjust segmental configurations rapidly over large distances (>0.5 nm). Glassy polymers exist in a non-equilibrium state with entangled molecular chains with immobile molecular backbones in frozen conformations. The glass transition temperature (Ts) is the dividing point between the rubbery or glassy state. Above the Tg, the polymer exists in the rubbery state; below the Ts, the polymer exists in the glassy state. Generally, glassy polymers provide a selective environment for gas diffusion and are favoured for gas separation applications. Rigid, glassy polymers describe polymers with rigid polymer chain backbones that have limited intramolecular rotational mobility and are often characterized by having high glass transition temperatures (Ts>150° C.). Suitable polymers are disclosed in US Patent Application Publication No. 2009/0111959 A1.

The mixed matrix membrane is typically formed by casting an homogeneous slurry containing particles of the DDR framework material and the desired polymer, flic slurry can be mixed, for example, using homogenizers and/or ultrasound to maximize the dispersion of the particles in the polymer or polymer solution. In addition, it may be desirable to enhance the compatibility of the molecular sieve and the polymer matrix by adding a small amount of the desired matrix polymer or any suitable "sizing agent" to a dispersion of the molecular sieve in a suitable solvent to produce an initial thin coating (i.e., boundary layer) of the polymer or sizing agent on the molecular sieve surface. After casting the membrane, the solvent is slowly evaporated to form a solid membrane film, the film is dried and can then be annealed by heating above its glass transition temperature.

Gas purification, for example, separation of methane from carbon dioxide, is typically effected by passage of the gas mixture through the membrane at a temperature between about 25° C. and 200° C. and a pressure of between about 50 psia and 5.000 psia (345 kPa and 34,500 kPa).

The invention will now be more particularly described with reference to the following Examples.

EXAMPLES

Comparative Example 1

The synthesis followed the procedure described in an article entitled "Separation of Permanent Gases on the All-Silica 8-Ring Clathrasil DD3R", Studies in Surface Science and Catalysis, 1994, 84, pp. 1159-1166, den Exter et al. The synthesis was performed in a teflon-lined stainless steel autoclave filled with the synthesis mixture for two thirds of the volume of the autoclave and heated in a hot air oven with a heating rate of 1.5° C./min. The reagents used were tetramethoxysilane (TMOS) (Fluka, >99%), fumed silica aerosil 200 (Degussa), sodium hydroxide p.a. (>99%), 1-adamantanamine hydrochloride (Janssen Chimica, 99+%) and ethylenediamine (Merck, >99%). The 1-adamantanamine (ADA) was prepared by adding equimolar amounts of aqueous NaOH to a solution of 1-adamantanamine hydrochloride and next extracting the mixture three times with diethyl ether. Finally, the solvent was removed by evaporation under vacuum and cooling in ice. The white coloured ADA was dried in a desiccator.

A synthesis mixture (47 ADA:100 $SiO_2$:404 EN:11240 $H_2O$) was prepared as follows: the ADA was dissolved in ethylenediamine (EN), water was then added rapidly and the mixture was placed in a shaking machine for one hour. After heating to 95° C. for one hour while stirring, the mixture was cooled down in ice and the ice-cooled TMOS added dropwise under vigorous stirring. Before filling the autoclave with the solution, the mixture was again heated to 95° C. while stirring until the solution became clear. The autoclave used had an internal volume of 45 ml. The mixture in the autoclave was held at a temperature of 160° C. for 600 hours under static conditions. The resulting crystalline material comprised a mixture of materials of DDR and DOH framework types.

Comparative Example 2

Comparative Example 1 was repeated, except that the mixture was stirred while in the autoclave at 160° C. for 600 hours. The resulting crystalline material was of the DDR framework type.

Examples 1 and 2 and Comparative Example 3

The synthesis procedure was adapted from that used for Comparative Example 1. 1-Adamantamine (5.93 g) was added to Ethylenediamine (19.63 g) in a plastic bottle and the mixture stirred for 30 min. Demineralized water (163.22 g) was then added to the mixture, the bottle was closed and agitated on a shaker for 1 hr. A portion of the mixture (80.48 g) was transferred to a 100 mL Teflon line Parr autoclave and a magnetic stir-bar was added. The autoclave was closed and placed in a 95° C. water bath and the mixture stirred for 1 hr. The autoclave was then quenched to room temperature, opened to add Aerosil 300 (2.11 g), and placed again in the 95° C. water bath and stirred at this temperature for 1 hr. Finally, methanol (10.24 g) was added. The autoclave was again closed and placed again in the 95° C. water bath and stirred at this temperature for 1 hr.

After the treatment at 95° C., the autoclave was quenched to room temperature. The slightly hazy mixture was withdrawn from the autoclave and a portion (10 g) placed in each of three 25 mL Teflon lined autoclaves. A small amount of colloidal sized seeds was added to each of the three autoclaves. For Example 1, 0.15 wt % of colloidal seeds of framework type CHA were added; for Example 2, 0.14 wt % of colloidal seeds of framework type LEV were added; for Comparative Example 3, 0.14 wt % of colloidal seeds of framework type MFI were added; in all cases, wt % is based on the total weight of the synthesis mixture. After addition of the seeds, the autoclaves were closed, heated to 160° C., and then maintained at 160° C. for an extended period (120 hours for Example 1 and Comparative Example 3, 85 hours for Example 2) without stirring. The autoclaves were then cooled to room temperature. The resulting materials were each washed, dried overnight, and then characterized with XRD (Scintag X2, Cu Kalpha, 40 kV, 45 mA) to determine the framework type. Example 1 yielded a DDR framework crystalline material. Example 2 yielded a mixture of a crystalline material comprising DDR and DOH framework types and an amorphous material. Comparative Example 3 yielded an amorphous material.

By comparison with Comparative Examples 1 and 2, Examples 1 and 2 demonstrated that the use of seed crystals significantly reduced synthesis time (from 600 hours to no more than 120 hours). Comparison between Examples 1 and 2 showed that CHA seed crystals provided pure DDR crystalline material, while LEV seeds provided impure DDR crystalline material. Comparison between Examples 1 and 2 and Comparative Example 3 showed that MFI seed crystals were not effective in providing DDR crystalline material.

Comparative Example 4

The procedure was adapted from US Patent Application Publication No. 2014/0161717 A1. The reagents used were SiO$_2$ (Ludox™ HS-40), sodium hydroxide solution (~50 wt % NaOH solution), methyltropinium iodide (MTI) (95%), demineralized water and colloidal seeds. A 50 g synthesis mixture with the following composition was made; 0.14 NaOH/0.25 MTI/SiO$_2$/47 H$_2$O. First, water, NaOH and colloidal seeds having framework type DDR were combined. The mixture was stirred with a magnetic stir bar, and then MTI was mixed in before the Ludox HS-40 was added. The amount of colloidal seeds was 0.1 wt %, based on the total weight of the synthesis mixture. The mixture was stirred until homogenous, then transferred to a 150 mL stainless steel autoclave. The autoclave was heated to 140° C. and maintained at that temperature for 144 hours with stirring of the synthesis mixture using a mixing paddle at 30 rpm. The resulting product was washed and analysed by XRD (Scintag X2, Cu Kalpha, 40 kV, 45 mA), and found to be a crystalline material with a DDR framework type.

Comparative Example 5

The procedure of Comparative Example 4 was followed, except that the synthesis mixture was not stirred when maintained at 160° C. for 96 hours. The resulting product was washed and analysed, and found to be a crystalline material with a DDR framework type.

Comparative Example 6

The procedure of Comparative Example 4 was followed, except that no seed crystals were used, and the synthesis mixture was not stirred when maintained at 160° C. for 96 hours. The resulting product was washed and analysed, and found to be an amorphous material.

Example 3

The procedure of Comparative Example 4 was followed, except that the seed crystals were of framework type LEV, and the synthesis mixture was not stirred when maintained at 160° C. for 96 hours. The resulting product was washed and analysed, and found to be a crystalline material with a DDR framework type.

Example 4

The procedure of Comparative Example 4 was followed, except that the seed crystals were of framework type CHA, the synthesis mixture was not stirred when maintained at 140° C., and the synthesis mixture was maintained at 140° C. for 18 hours, then heated to 160° C. at 40° C./h and maintained another 80 hours at 160° C. without stirring. The resulting product was washed and analysed, and found to be a crystalline material with a DDR framework type.

Comparative Examples 4-6 and Examples 3-4 demonstrate that a pure crystalline material of framework type DDR can be obtained in a relatively short time without stirring of the synthesis mixture during crystallisation and using seed crystals of a framework type other than DDR, in particular of framework type LEV or CHA.

Furthermore, all of the Examples show that a synthesis mixture free from fluoride is effective in the synthesis of DDR framework type materials.

While the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A method of synthesizing a molecular sieve of DDR framework type, the method comprising the steps of:
   a) preparing a synthesis mixture capable of forming a molecular sieve of DDR framework type, said synthesis mixture comprising water, a silicon source, optionally a source of a trivalent element X, optionally a source of a pentavalent element Z, optionally a source of hydroxide ions, optionally a source of a metal cation M, a structure directing agent, and seed crystals having a framework type selected from CHA and LEV; said synthesis mixture being substantially free from fluoride ions;
   b) heating said synthesis mixture under static crystallization conditions for a time sufficient to form crystals of said molecular sieve of DDR framework type, said crystallization conditions including a temperature of from 100° C. to 220° C.; and
   c) recovering said crystals of the molecular sieve of DDR framework type from the synthesis mixture.

2. The method according to claim 1, wherein the structure directing agent is selected from the group consisting of N,N-dialkyltropinium salts, 1-adamantanamine, and N,N-dialkyl-3-azonium bicyclo[3.2.2]nonane salts and 1-adamantanamine.

3. The method according to claim 1, wherein the synthesis mixture comprises the seed crystals in an amount of from 0.05 wt % to 1 wt %, based on the weight of the synthesis mixture, wherein the seed crystals are included in the synthesis mixture in the form of a colloidal suspension in water.

4. The method according to claim 1, wherein X, if present, is selected from the group consisting of Al, B, Ga and mixtures thereof.

5. The method according to claim 1, wherein M, if present, is an alkali metal cation, selected from the group consisting of sodium, potassium and mixtures thereof.

6. The method according to claim 1, wherein the synthesis mixture has a composition in terms of mole ratios within the following ranges:
   X:SiO$_2$ up to 0.02,
   H$_2$O:SiO$_2$ 5 to 200,
   OH$^-$:SiO$_2$ 0 to 2.0,
   M:SiO$_2$ 0 to 2.0,
   R:SiO$_2$ 0.01 to 2.0,
wherein R represents the structure directing agent.

7. The method according to claim 1, wherein the structure directing agent is selected from N,N-dialkyltropinium salts and N,N-dialkyl-3-azonium bicyclo[3.2.2]nonane salts, and the synthesis mixture has a composition in terms of mole ratios within the following ranges:
   X:SiO$_2$ up to 0.02,
   H$_2$O:SiO$_2$ 5 to 200, OH⁻:SiO₂ 0 to 2.0,
M:SiO₂ 0 to 2.0,
R:SiO₂ 0.01 to 2.0,
wherein R represents N,N-dialkyltropinium or N,N-dialkyl-3-azonium bicyclo[3.2.2]nonane cations.

8. The method according to claim 7, wherein the structure directing agent is selected from N,N-dimethyltropinium salts, N,N-diethyltropinium salts, N,N-methylethyltropinium salts, N,N-dimethyl-3-azonium bicyclo[3.2.2]nonane salts, N,N-diethyl-3-azonium bicyclo[3.2.2]nonane salts, and N,N-methylethyl-3-azonium bicyclo[3.2.2]nonane salts.

9. The method according to claim 1, wherein the structure directing agent is 1-adamantanamine and the synthesis mixture has a composition in terms of mole ratios within the following ranges:
X:SiO₂ up to 0.02,
H₂O:SiO₂ 5 to 200,
OH⁻:SiO₂ 0 to 2.0,
M:SiO₂ 0 to 2.0,
R:SiO₂ 0.01 to 2.0,
wherein R represents 1-adamantanamine.

10. The method according to claim 9, wherein synthesis mixture further contains ethylene diamine (EN) within the following range:
EN:SiO₂ 1 to 10.

11. The method according to claim 1, wherein the crystallization conditions in step (b) include a temperature of from 100° C. to 200° C.

12. The method according to claim 1, wherein the crystallization conditions in step (b) include heating for a period of from 1 to 800 hours.

13. A method according to claim 1, wherein the synthesis mixture is contacted with a support material during step (b).

14. The method according to claim 1, wherein the recovered crystals of the molecular sieve of DDR framework type are subjected to calcination at a temperature of from 400 to 600° C.

15. The method according to claim 1, wherein the molecular sieve of DDR framework type is ZSM-58.

* * * * *